US011563686B2

(12) United States Patent
Shen et al.

(10) Patent No.: US 11,563,686 B2
(45) Date of Patent: Jan. 24, 2023

(54) DYNAMIC DETERMINISTIC ADJUSTMENT OF BANDWIDTH ACROSS MULTIPLE HUBS WITH ADAPTIVE PER-TUNNEL QUALITY OF SERVICE (QOS)

(71) Applicant: Cisco Technology Inc., San Jose, CA (US)

(72) Inventors: Changhong Shen, Shanghai (CN); Hongbo Xia, Shanghai (CN); Xiao-Rong Wang, Shanghai (CN); Yin Wang, Shanghai (CN); Lulu Wang, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 82 days.

(21) Appl. No.: 17/122,014

(22) Filed: Dec. 15, 2020

(65) Prior Publication Data
US 2022/0052949 A1    Feb. 17, 2022

(30) Foreign Application Priority Data
Aug. 14, 2020  (WO) ................ PCT/CN2020/109400

(51) Int. Cl.
*H04L 12/46*    (2006.01)
*H04L 12/26*    (2006.01)
(Continued)

(52) U.S. Cl.
CPC .......... *H04L 47/12* (2013.01); *H04L 12/4633* (2013.01); *H04L 43/16* (2013.01); *H04L 47/24* (2013.01)

(58) Field of Classification Search
None
See application file for complete search history.

(56) References Cited

U.S. PATENT DOCUMENTS 11,228,529 B1 *    1/2022  Amicangioli ........... H04L 47/22
2008/0259803 A1    10/2008  Elliot et al.
(Continued)

FOREIGN PATENT DOCUMENTS

CN    109257252 A    1/2019
JP    2015201772 A    11/2015
(Continued)

OTHER PUBLICATIONS

PCT Notification of Transmittal of the International Search Report and the Written Opinion of the International Searching Authority, or the Declaration; International Application No. PCT/US2021/044880; 14 pages; dated Nov. 23, 2021.
(Continued)

*Primary Examiner* — Hong Shao
(74) *Attorney, Agent, or Firm* — Baker Botts, LLP

(57) ABSTRACT

According to certain embodiments, a system comprises one or more processors and one or more computer-readable non-transitory storage media comprising instructions that, when executed by the one or more processors, cause one or more components of the system to perform operations. The operations comprise sending data from a hub to a spoke and receiving feedback from the spoke at the hub. The feedback is based on at least one of bandwidth utilization or occurrence of a congestion state detected by the spoke. The operations further comprise adjusting a shaper rate of an adaptive Quality of Service (QoS) shaper based at least in part on the feedback received from the spoke.

16 Claims, 7 Drawing Sheets

(51) Int. Cl.
    *H04L 12/801*    (2013.01)
    *H04L 12/851*    (2013.01)
    *H04L 47/12*    (2022.01)
    *H04L 43/16*    (2022.01)
    *H04L 47/24*    (2022.01)

(56) References Cited

U.S. PATENT DOCUMENTS

| | | |
|---|---|---|
| 2010/0208587 A1 | 8/2010 | Landry et al. |
| 2012/0250516 A1 | 10/2012 | Aggarwal et al. |
| 2012/0275344 A1 | 11/2012 | Hajiaghayi et al. |
| 2015/0032871 A1 | 1/2015 | Allan et al. |
| 2016/0080252 A1 | 3/2016 | Ramachandran et al. |
| 2016/0080502 A1* | 3/2016 | Yadav .................. H04L 45/28 709/227 |
| 2016/0127944 A1 | 5/2016 | Pan et al. |

FOREIGN PATENT DOCUMENTS

| | | | |
|---|---|---|---|
| WO | 2013024382 | A1 | 2/2013 |
| WO | 2016044413 | A1 | 3/2016 |

OTHER PUBLICATIONS

PCT Notification of Transmittal of the International Search Report and the Written Opinion of the International Searching Authority, or the Declaration; International Application No. PCT/CN2020/109400; 10 pages; dated May 12, 2021.

\* cited by examiner

US 11,563,686 B2

DYNAMIC DETERMINISTIC ADJUSTMENT OF BANDWIDTH ACROSS MULTIPLE HUBS WITH ADAPTIVE PER-TUNNEL QUALITY OF SERVICE (QOS)

RELATED APPLICATIONS

This application claims priority to International Application No. PCT/CN2020/109400, filed Aug. 14, 2020.

TECHNICAL FIELD

The present disclosure generally relates to adjusting bandwidth in a computer network, and more specifically to dynamic deterministic adjustment of bandwidth across multiple hubs with Adaptive Per-Tunnel Quality of Service (QoS).

BACKGROUND

A computer network may refer to a group of computing components (e.g., gateways, routers, end devices, etc.) that communicate over network connections. Computer networks may support many applications and services. As an example, computer networks may support cloud-based services, such as software-as-a-service and infrastructure-as-a-service services.

DESCRIPTION OF EXAMPLE EMBODIMENTS

Overview

Figure 1A:
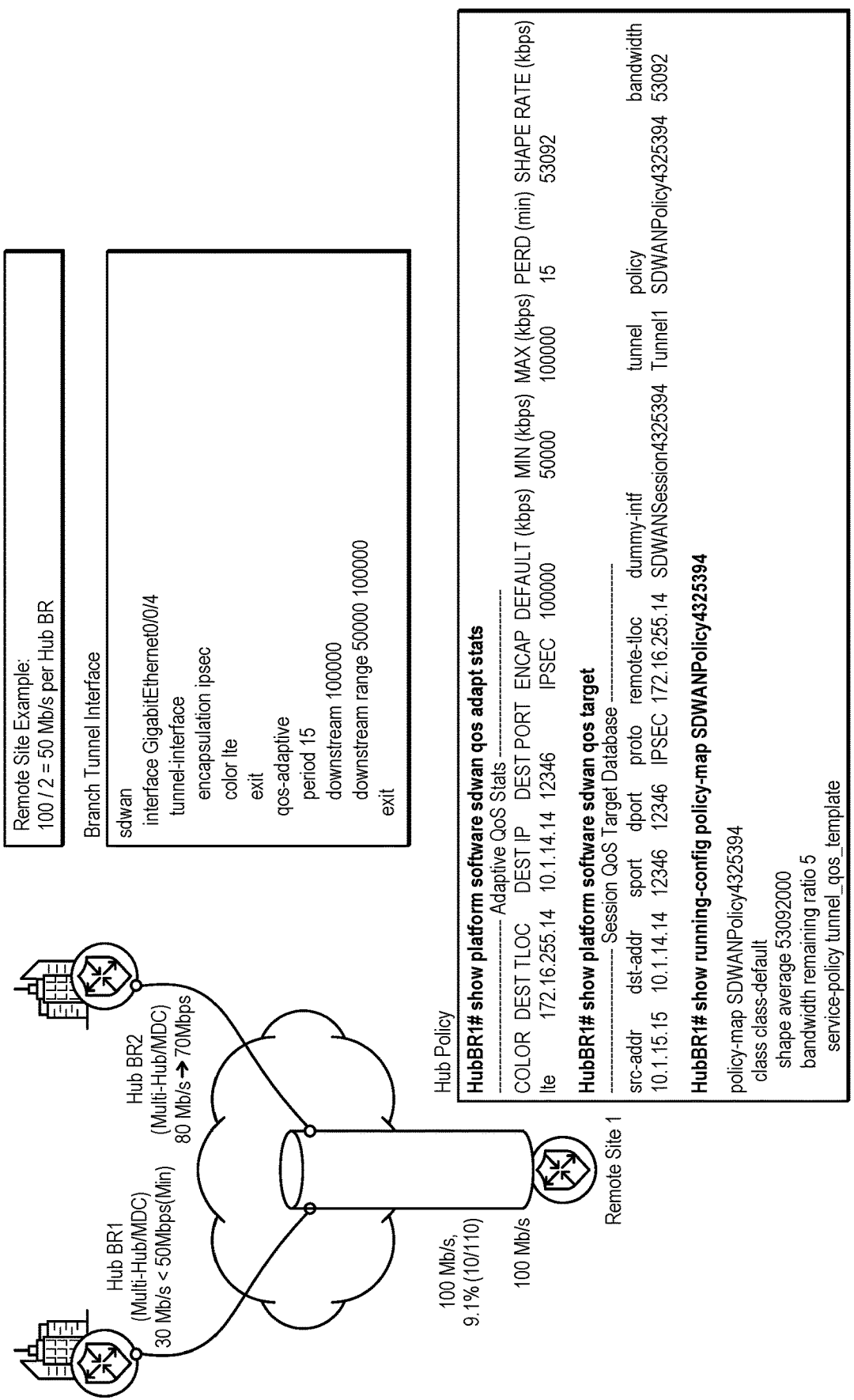
FIGS. 1A, 1B, and 1C each illustrate an example of a network in which bandwidth is shared among multiple hub routers.

According to an embodiment, a system comprises one or more processors and one or more computer-readable non-transitory storage media comprising instructions that, when executed by the one or more processors, cause one or more components of the system to perform operations. The operations comprise sending data from a hub to a spoke and receiving feedback from the spoke at the hub. The feedback is based on at least one of bandwidth utilization or occurrence of a congestion state detected by the spoke. The operations further comprise adjusting a shaper rate of an adaptive Quality of Service (QoS) shaper based at least in part on the feedback received from the spoke.

According to another embodiment, a method comprises sending data from a hub to a spoke and receiving feedback from the spoke at the hub. The feedback is based on at least one of bandwidth utilization or occurrence of a congestion state detected by the spoke. The method further comprises adjusting a shaper rate of an adaptive QoS shaper based at least in part on the feedback received from the spoke.

According to yet another embodiment, one or more computer-readable non-transitory storage media may embody instructions that, when executed by a processor, cause the performance of operations including sending data from a hub to a spoke and receiving feedback from the spoke at the hub. The feedback is based on at least one of bandwidth utilization or occurrence of a congestion state detected by the spoke. The operations further include adjusting a shaper rate of an adaptive QoS shaper based at least in part on the feedback received from the spoke.

Technical advantages of certain embodiments of this disclosure may include one or more of the following. The systems and methods described herein may allow for efficient bandwidth sharing among hubs in full mesh networks or other multi-hub networks. Certain embodiments may allow bandwidth to be shared fairly among hubs, for example, based on feedback of bandwidth utilization and congestion state per each remote hub. In certain embodiments, a hub may selectively adjust the current shaper rate based on expected throughput together with WAN Loss measurement. Certain embodiments may reduce or eliminate resonance of adaptive behavior and/or shaper rate flapping.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

A shaper may be applied to traffic in a software defined wide area network (SD-WAN) as part of a QoS policy. Previously, shapers that were static in value were applied as part of an egress QoS policy. These static shapers were configured based on a service provider bandwidth offering and did not change with time. Thus, the static shapers would not reflect the actual available Internet bandwidth. To address this issue, an Adaptive QoS feature can be introduced to the SD-WAN. Examples of Adaptive QoS techniques are described in U.S. patent application Ser. No. 16/891,624 filed Jun. 3, 2020, titled "Systems and Methods for Adapting a WAN Egress Shaper Rate," and U.S. patent application Ser. No. 16/666,904 filed Oct. 29, 2019, titled "Congestion Avoidance with Adaptive QoS policy enforcement from SD-WAN Controller in SD-WAN Networks."

Certain embodiments of an Adaptive QoS feature enable a WAN interface shaper and a per-tunnel shaper at the edge of an enterprise to adapt to the available WAN bandwidth in the upstream and downstream, respectively. The ability to adapt to the bandwidth allows for controlling differentiated drops at the enterprise edge and reduces or prevents packet drops in the network core.

Adaptive QoS may be used for data center and branch sites with hub-spoke topology. For example, Adaptive QoS may be configured on a spoke WAN interface, and upstream and downstream Adaptive QoS can be enabled independently. Upstream adapting works on the spoke WAN interface QoS shaper. Downstream adapting works on the hub-to-spoke per-tunnel QoS shaper, which requires enabling hub-to-spoke per-tunnel QoS.

FIG. 1A illustrates an example deployment for Adaptive QoS in an SD-WAN.

In particular, FIG. 1A illustrates how Adaptive QoS works for the use case of two hubs (Hub BR1 and Hub BR2) using sequence-based loss measurement and distributed loss-based QoS shaper adapting between the hub and spoke tunnels to the spoke (Remote Site 1). In FIG. 1A, Hub BR1 and Hub BR2 each work independently based on a WAN Loss measurement and feedback. Each hub independently adjusts its own shaper rate based on the loss percentage for each adapt cycle. For multi-hub BR deployments, there are typically two requirements to consider:

QoS fairness among multiple senders for bandwidth sharing during remote site congestion; and Dynamic adjustment of bandwidth based on weights and priorities for multiple hubs.

Certain Adaptive QoS implementations work well with two hubs by properly configuring the minimum, maximum, and default bandwidth parameters to ensure QoS fairness with a minimum bandwidth guarantee of 50%. However, when it comes to multiple hubs or multiple data center deployments, such as full mesh deployments or other deployments with more than two hubs, it becomes more challenging to ensure QoS fairness and dynamic adjustment of the bandwidth between multiple hubs based on weights.

Figure 1B:
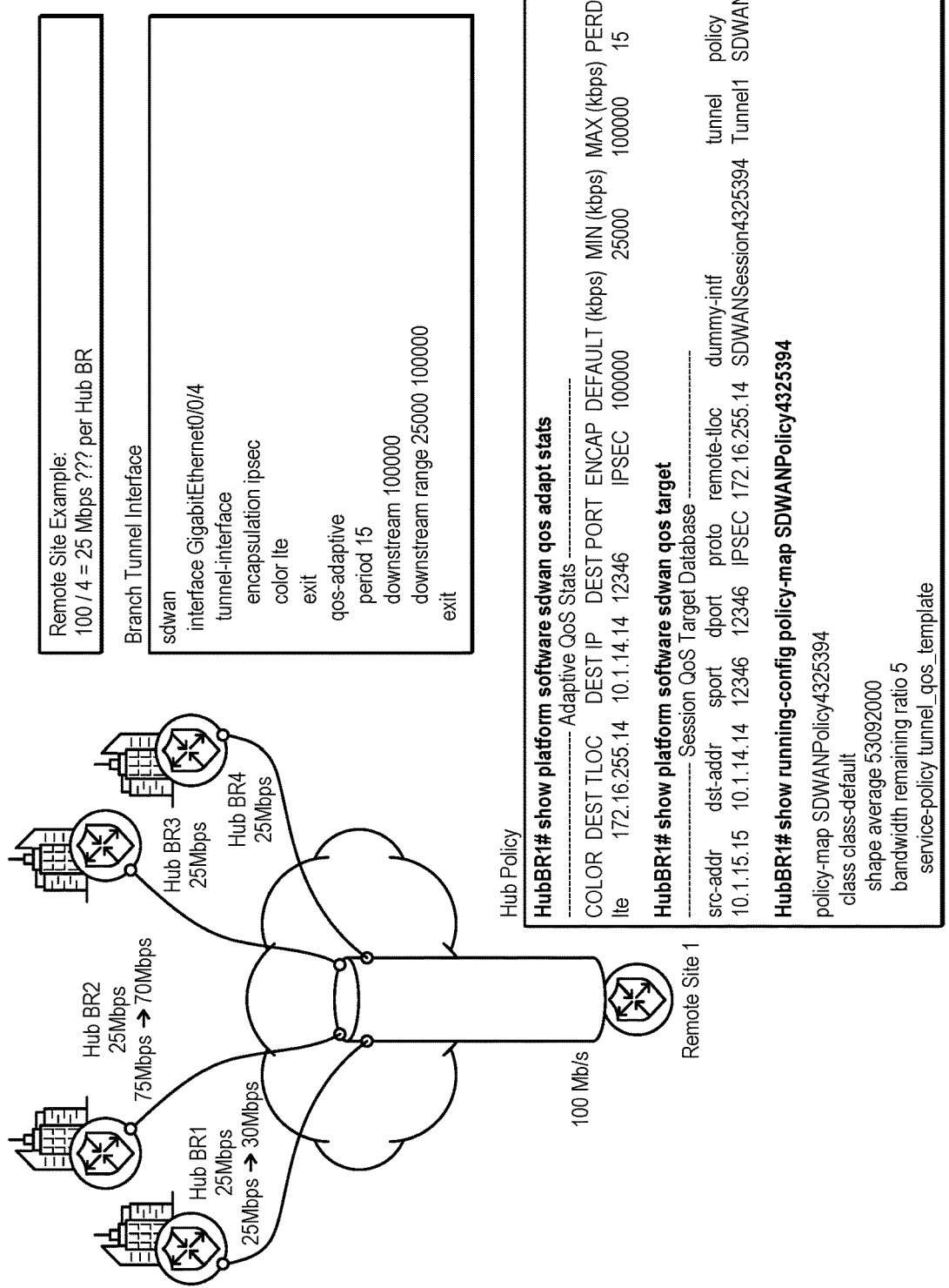

FIG. 1B illustrates a problem that can occur with adaptive QoS when there are more than two hub routers. In the example of FIG. 1B, the bandwidth parameters for Adaptive QoS are configured as default 100 Mbps, minimum 25 Mbps, and maximum 100 Mbps on the downstream WAN interface to the spoke. These Adaptive QoS parameters get published across the SD-WAN fabric (e.g., hub routers Hub BR1, Hub BR2, Hub BR3, and Hub BR4). The hub routers may then use the Adaptive QoS parameters for the downstream Adaptive QoS function. With such a config profile, each hub router can achieve a minimum guarantee of 25 Mbps during congestion state. This can cause certain challenges. For example, the hub routers may be unable to share bandwidth fairly during congestion, so different hub routers may have different bandwidth consumptions. This could lead to a resonance of adaptive behavior and shaper rate flapping with UP/DOWN respectively for these hub routers. Thus, relying on such a QoS-adaptive lower-bound parameters to ensure QoS fairness does not work efficiently with more than two Hub Routers, such as in the multiple hub/data center use cases.

Certain embodiments of the present disclosure propose a solution to this problem. For example, certain embodiments propose extending the Adaptive QoS Path-Mon measurement to provide remote branch sites' feedback of bandwidth utilization and congestion state per each remote Hub BR so that Hub BRs can selectively adjust the current shaper rate based on expected throughput together with WAN Loss measurement. Additionally, certain embodiments introduce a per-tunnel level bandwidth/throughput measurement with congestion monitoring for the receiver side. The spoke side can selectively provide feedback of bandwidth adjustment to the sender side with Path-Mon type-length-value (TLV) parameters to complement the WAN Shaper Adapting Algorithm and consider remote WAN congestion. Hence, multiple hub senders (e.g., BR1-BR4) can adjust the shaper rate in a coordinated manner for each monitor interval based on the whole SD-WAN fabric bandwidth utilization and congestion state from multiple senders.

In certain embodiments, Adaptive QoS includes a Path-Monitor function module that enables active monitoring and synchronization of sender/receiver sequences as well as sending throughput and bandwidth per SD-WAN tunnel per monitoring interval. With these Path-Mon metrics, the sender side enforces a loss-based QoS shaper adapting algorithm and adjusts the shaper rate adaptively and independently for each monitor interval. A new field can be introduced to the Path-Mon TLV metrics. The new field indicates the expected throughput that the receiver expected to receive from the sender side. The "Expected Throughput" field (default value "0" for old version) can be used as part of the QoS shaper adapting algorithm to facilitate additional shaper rate bandwidth adjustment together with the existing loss-based approach:

If both Local loss and WAN loss are not detected (within certain threshold), no need to adapt the QoS shaper rate.

Else if "Expected Throughput" is greater than (or equal to) the current QoS shaper rate, no need to adapt the QoS shaper rate.

Else if WAN loss is detected (over certain threshold), adapt the QoS shaper rate DOWN.

Else if "Expected Throughput" is less than the current QoS shaper rate, need to adapt the QoS shaper rate DOWN.

Else, adapt the QoS shaper rate UP.

The following provides a detailed explanation on how it works on a branch site that can selectively provide remote feedback to bandwidth adjustment together with existing WAN loss-based measurement approach by introducing bandwidth/throughout monitoring on the receiving side with "Expected Throughput" feedback to hub sites via existing bidirectional forwarding detection Path-Mon TLV. Those hubs with a current shaper rate below the "Expected Throughput" should not decrease the shaper rate even if WAN Loss has been detected. Those hubs with a current shaper rate above the "Expected Throughput" should decrease the shaper rate directly to the expected throughput based on WAN loss condition.

Figure 1C:
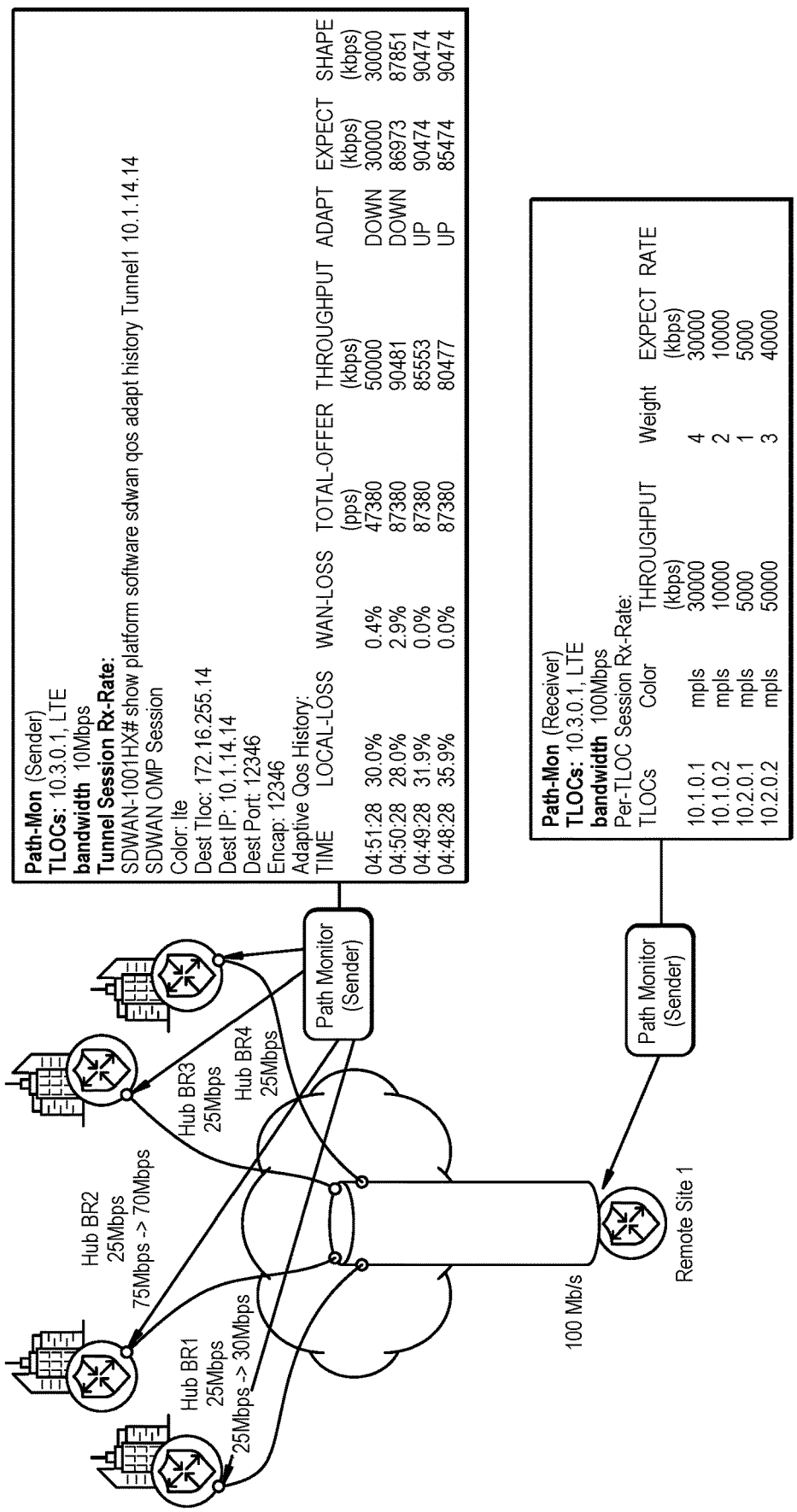

FIG. 1C provides an example. On the spoke side, the "Expected Throughput" per remote hub transport location (TLOC) session can be adjusted to take care of weight and priorities per each TLOC, and the "Expected Throughput" feedback for each hub can be adjusted based on each TLOC session's weight (which may be published via an operation and maintenance platform (OMP) across the SDWAN Fabric). Example steps to calculate "Expected Throughput" are set forth below:

1. Enable a weighted Adaptive QoS bandwidth policy on spoke TLOC;
2. Each Hub BR enables tunnel encapsulation with an existing weight attribute per TLOC and publishes via OMP;
3. Monitor the downstream throughput of the hub-to-spoke session on the Path-Mon receiver side (on a per tunnel basis);
4. During Path-Mon end, calculate "Expected Throughput" by:
    a. walking through all hub sessions for throughput meeting expected throughput: If (session_throughput<=total_bandwidth*weight/total_weight), "Expected Throughput"=session throughput;
    b. walking through all hub sessions for throughput not meeting expected throughput: If (session_throughput>total_bandwidth* weight/total_weight), "Expected Throughput"= throughput_left*weight/total_weight_left; and To summarize certain embodiments described above, the present disclosure proposes a new approach so that in an SD-WAN comprising multiple hub senders, the hub senders can adjust the shaper rate more effectively based on remote branch sites' feedback of bandwidth utilization and congestion state. This distributed approach may result in deterministic Adaptive QoS shaper behavior and QoS fairness across multiple hub BRs along with an existing WAN loss-based measurement mechanism. This approach may also provide bandwidth sharing across multiple hubs based on weights and priorities. In certain embodiments, a Path-Mon module may be extended to support monitoring ingress bandwidth/throughput per TLOC basis on receiver side, and an expected throughput may be derived considering weights of hub BRs. The "expected throughput" feedback to hub BRs via BFD Path-mon TLV is used to extend a distributed loss-based QoS shaper adapting algorithm, so multiple hub senders can adjust the shaper rate in coordination with each other for each of the adapt intervals.

History Visualization and Smart Config Recommendation for Adaptive QoS

Certain embodiments may provide history visualization and/or smart configuration recommendations for Adaptive QoS. Certain embodiments provide visualization of the adaptive QoS history (such as QoS shaper rate adapting history) on the management plane. As an example, a manager (such as Cisco's vManage) may be used to provide visualization of the adaptive QoS history on the management plane. Optionally, visualization of the adaptive QoS history may also be visible on an edge device (such as Cisco's cEdge), for example, through a command line interface (CLI).

In certain embodiments, adaptive QoS may be configured via the management plane. As an example, adaptive QoS on a specific interface may be set up using initial values for MIN, MAX, and default bandwidth. The adaptive QoS values may be configurable such that different customers or different sites may use different values. As an example, certain embodiments update values based on network performance and/or provide a user interface that enables a user to select a value within a certain range. Certain embodiments may apply rules based on a relationship between one value and another value, such as Min=50% of Max, and Default=80~90% of Max bandwidth. Certain embodiments may recommend values in order to optimize performance of the adaptive QoS feature.

Certain embodiments of the present disclosure propose management plane visualization of adaptive QoS history, auto bandwidth config by Speedtest, and/or a smart way to recommend config revision based on history alarms.

Currently, cEdge stores the latest 8 adapting history for each session (Hub downstream) and WAN interface (Spoke upstream). The adapting history can be viewed via CLI, for example:

HUB# show platform software sdwan qos adapt history
Tunnel 1 10.1.14.14
SDWAN OMP Session
Color: lte
Dust. Tloc: 172.16.255.14
Dest IP: 10.1.14.14
Dest Port: 12346
Encap: IPSEC
Adaptive QoS History:

| TIME 2020 May 21 | LOCAL-LOSS | WAN-LOSS | TOTAL-OFFER (pps) | THROUGHPUT (kbps) | ADAPT | SHAPE-RATE (kbps) |
|---|---|---|---|---|---|---|
| T04:51:28 | 30.0% | 0.4% | 87380 | 87852 | DOWN | 86973 |
| T04:50:28 | 28.0% | 2.9% | 87380 | 90481 | DOWN | 87851 |
| T04:49:28 | 31.9% | 0.0% | 87380 | 85553 | UP | 90474 |
| T04:48:28 | 35.9% | 0.0% | 87380 | 80477 | UP | 85474 |
| T04:47:28 | 39.9% | 0.0% | 87380 | 75475 | UP | 80474 |
| T04:46:28 | 40.5% | 0.0% | 87380 | 74777 | UP | 75474 |
| T04:45:28 | 39.9% | 0.6% | 87380 | 75480 | DOWN | 74727 |
| T04:44:28 | 40.5% | 0.0% | 87380 | 74737 | UP | 75481 |

SPOKE# show platform software sdwan qos adapt history
GigabitEthernet0/0/4
SDWAN upstream adaptive QoS
Interface: GigabitEthernet0/0/4
Adaptive QoS History:

| TIME 2020 May 21 | LOCAL-LOSS | WAN-LOSS | TOTAL-OFFER (pps) | THROUGHPUT (kbps) | ADAPT | SHAPE-RATE (kbps) |
|---|---|---|---|---|---|---|
| T02:43:44 | 56.0% | 0.0% | 34952 | 22087 | UP | 25100 |
| T02:42:44 | 62.0% | 0.0% | 34952 | 19089 | UP | 22100 |
| T02:41:44 | 67.9% | 0.0% | 34952 | 16091 | UP | 19100 |
| T02:40:44 | 73.9% | 0.0% | 34952 | 13091 | UP | 16100 |
| T02:39:44 | 79.9% | 0.0% | 34952 | 10091 | UP | 13100 |
| T02:38:44 | 80.1% | 0.0% | 34952 | 9990 | UP | 10100 |
| T02:37:44 | 80.1% | 29.4% | 34952 | 9990 | DOWN | 10000 |
| T02:36:44 | 80.1% | 29.4% | 34952 | 9990 | DOWN | 10000 |

Figure 2:
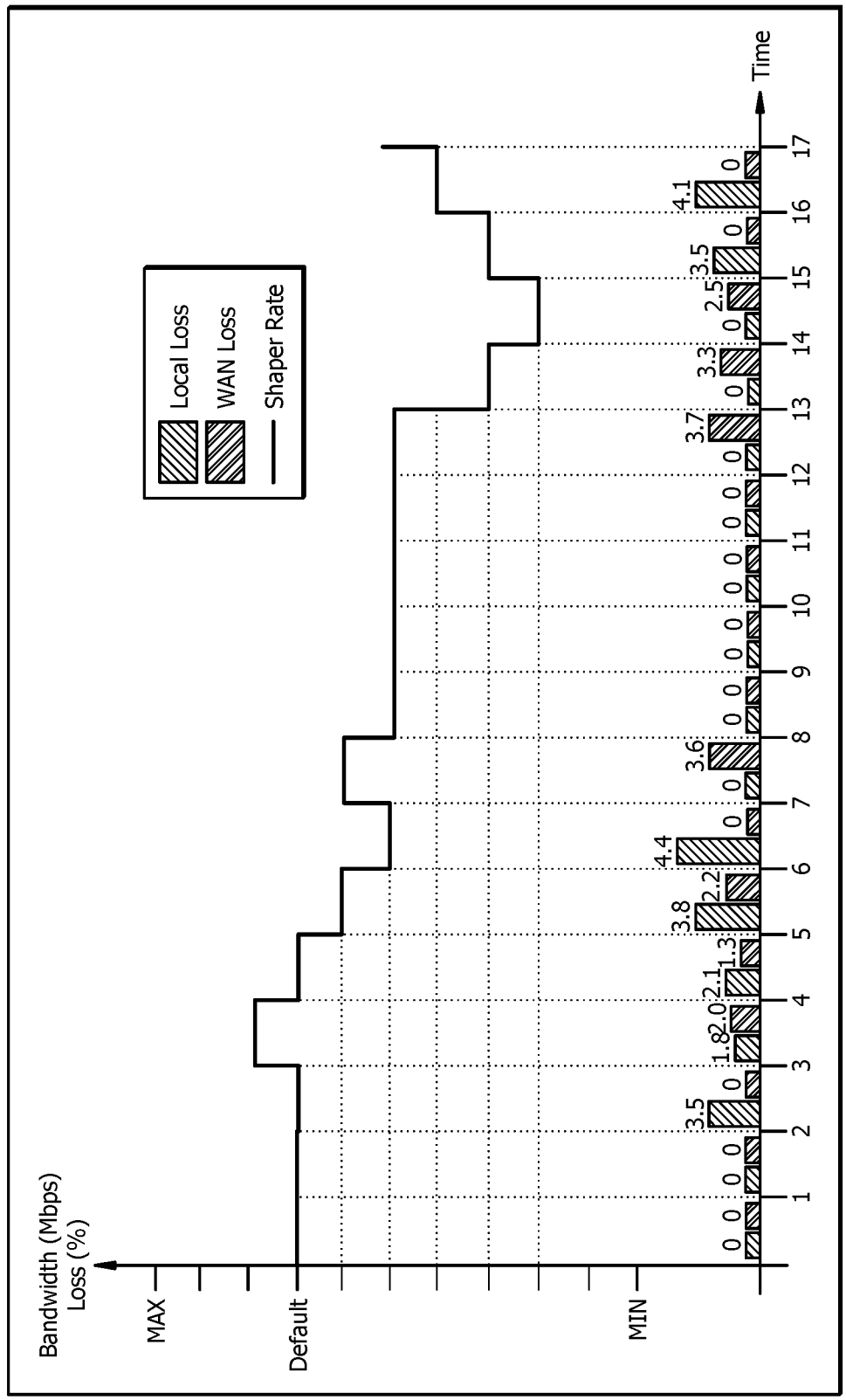
FIG. 2 illustrates an example of visualizing adaptive QoS history in a management plane.

In certain embodiments of the present disclosure, an edge router can periodically export the adapting history to management plane (vManage), and vManage can make the adapting history visible. FIG. 2 illustrates an example where the management plane visualizes history information along with the detailed local and WAN loss data. In FIG. 2, Local Loss and WAN Loss are shown in alternating bars such that for each time period, Local Loss is shown on the left and WAN Loss is shown on the right. For example, for the first time period, Local Loss=0 and WAN Loss=0; for the second time period, Local Loss=0 and WAN Loss=0; for the third time period, Local Loss=3.5 and WAN Loss=0; for the fourth time period Local Loss=1.8 and WAN Loss=2.0, and so on. The "shaper rate" line illustrates whether the shaper rate increases, decreases, or stays the same for an adaptive time period depending on the local loss and WAN loss values. The example in FIG. 3 shows that the shaper rate keeps the default value after the first and second time periods because there is no local loss and no WAN loss. The shaper rate increases after the third period because there is local loss (3.5) but no WAN loss (0) during the third period. The shaper rate decreases after the fourth period because there is local loss (1.8) and WAN loss (2.0) during the fourth period. The shaper rate continues to adapt in subsequent time periods depending on the local loss and WAN loss.

Figure 3A:
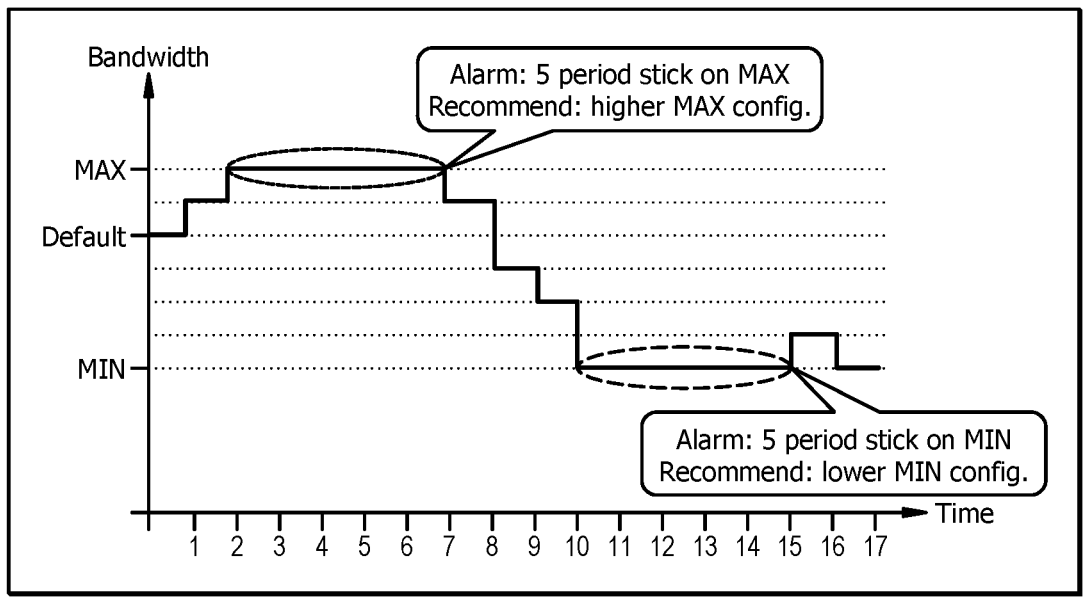
FIGS. 3A and 3B each illustrate an example of using adaptive QoS history to recommend or dynamically implement a configuration change.

The most straightforward way to configure the default bandwidth value is directly using contracted rate with a service provider (SP). Considering the config scale and the variety of active bandwidth, a speed test can be used to detect the upstream and downstream active bandwidth when enabling adaptive QoS, and the detected bandwidth is directly used as the default value. Once the MIN, MAX, and default values get configured, the edge router would adapt the QoS shaper rate according to path monitor metrics and an adapting algorithm. Depending on whether the user-configured values are suitable for reality, a smart config decision (or recommendation) may be generated in the way of:

- If the QoS shaper rate sticks to the MAX bandwidth for certain adapting periods and there is no WAN loss but local loss or high traffic throughput, the MAX value can be dynamically increased (or an alarm may be sent to the customer in order to recommend increasing the MAX value). FIG. 3A illustrates an example in which the QoS shaper rate sticks to the MAX bandwidth for five adapting time periods (i.e., time periods 2, 3, 4, 5, and 6).
- If the QoS shaper rate sticks to the MIN bandwidth for certain adapting periods and there is still WAN loss, the MIN value can be dynamically decreased (or an alarm may be sent to the customer in order to recommend decreasing the MIN value). FIG. 3A illustrates an example in which the QoS shaper rate sticks to the MIN bandwidth for five adapting time periods (i.e., time periods 10, 11, 12, 13, and 14).

Figure 3B:
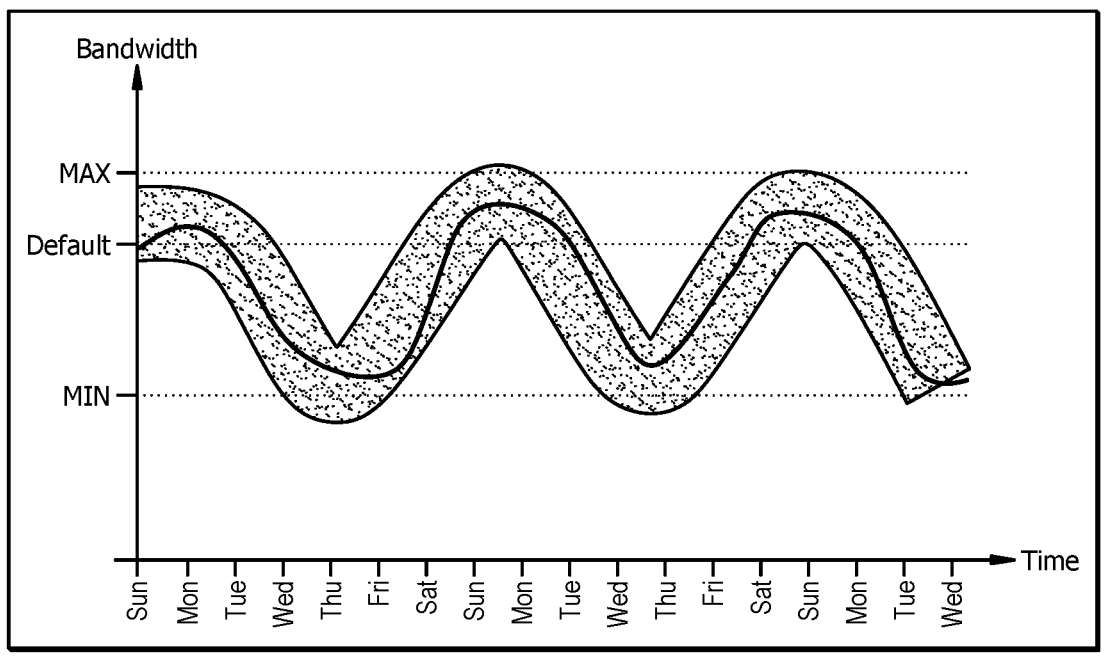

The management plane full adaptive QoS history can be used to find the daily, weekly, monthly, and yearly regularity of WAN available bandwidth. FIG. 3B illustrates weekly adapting history as an example. Based on the regularity of the adapting history, the management plane can recommend a smart configuration or may even dynamically adjust the parameters.

Figure 4:
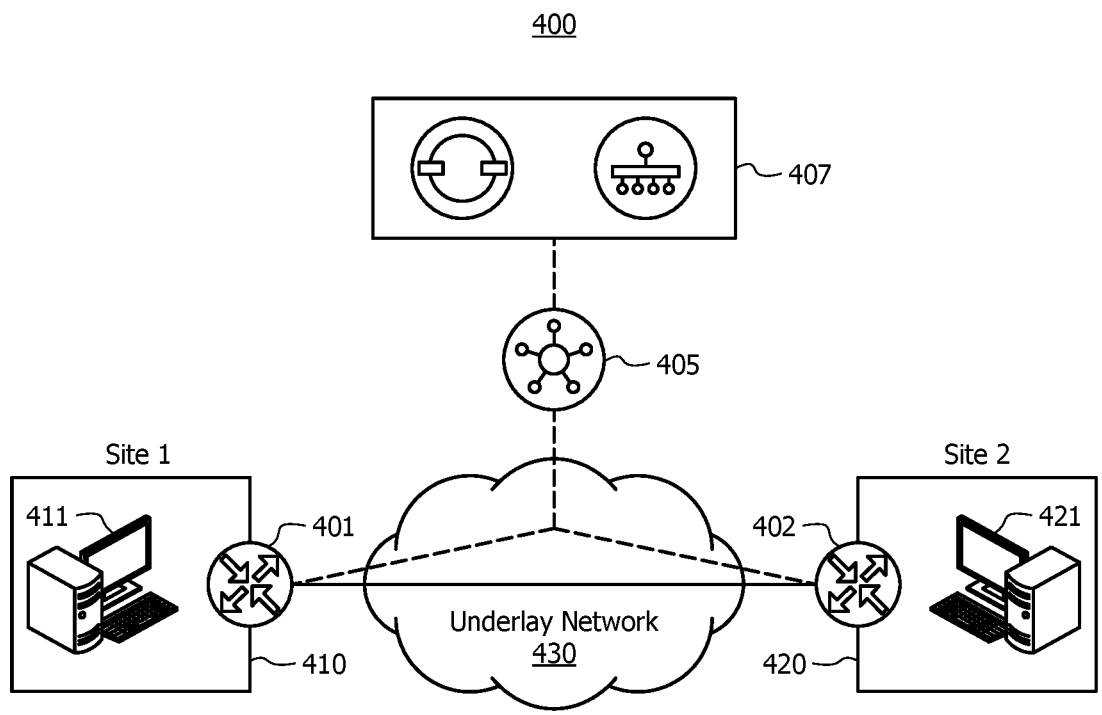
FIG. 4 illustrates an example architecture of an SD-WAN.

FIG. 4 illustrates an example architecture of an SD-WAN. In particular embodiments, a network 400 may be SD-WAN which is a virtual overlay network based on tunnels that carry traffic between a plurality of sites over one or more underlay networks 430. The example illustrated in FIG. 4 shows two sites: a first site 410 and a second site 420. Each site may comprise one or more user devices, for example, as shown by user device 411 of first site 410 and user device 421 of second site 420. Each site may connect to the network 400 via one or more WAN-edge routers. For example, the first site 410 connects to the network 400 through an edge router 401, and the second site 420 connects to the network 400 through an edge router 402. In certain embodiments, each edge router 401 and 402 may be configured as a spoke router that may receive data from a plurality of hub routers (e.g., BR1, BR2, BR3, and/or BR4 discussed above). A site connected to the network 400 may have a data plane connection to each of the other sites through Internet Protocol Security (IPSec) tunnels. The edge routers 401 and 402 may have a data plane connection over the underlay network 430. The underlay network 430 may comprise Multiprotocol Label Switching (MPLS), Internet, and cellular networks. An SD-WAN control plane may comprise a controller 405 that may maintain a centralized routing table and the routing policies to program the forwarding behavior of the data plane. The controller 405 may maintain direct control plane connection to each edge router. The controller 405 may provision, maintain, and secure the entire overlay network. The SD-WAN network 400 may also comprise management/orchestration plane 407. Although this disclosure describes a SD-WAN network in a particular manner, this disclosure contemplates a SD-WAN network in any suitable manner.

Figure 5:
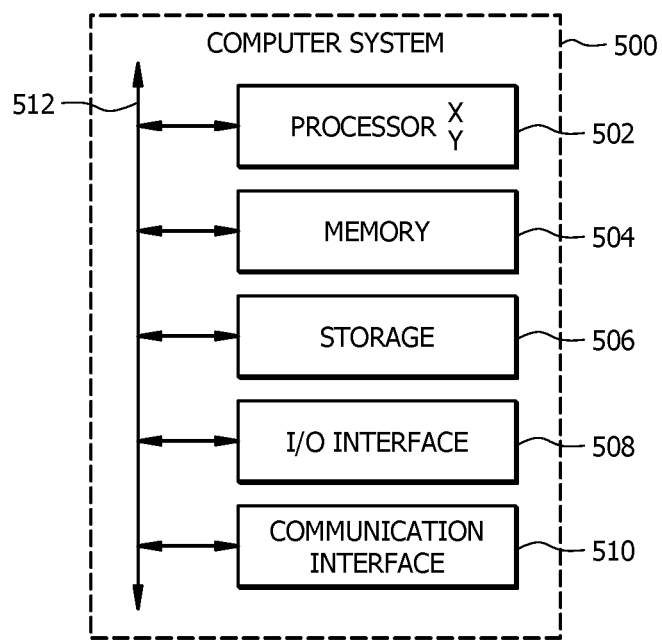
FIG. 5 illustrates an example of a computer system.

FIG. 5 illustrates an example computer system 500. In certain embodiments, a hub, a router, or a remote site described with respect to any of FIGS. 1A-1C may be implemented using a computer system 500. In certain embodiments, one or more components of network 400 of FIG. 4 may be implemented using a computer system 500. In particular embodiments, one or more computer systems 500 perform one or more steps of one or more methods described or illustrated herein, such as one or more steps of the method described with respect to FIG. 6. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example, and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes processing circuitry (e.g., processor 502), memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example, and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example, and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In certain embodiments, processor 502 may include one or more modules to facilitate the functionality described herein. As an example, processor 502 may comprise a feedback module X configured to receive feedback from one or more remote routers and/or an adaptive QoS module Y configured to adjust a shaper rate based at least in part on the feedback.

In particular embodiments, memory 504 includes main memory for storing instructions for processor 502 to execute or data for processor 502 to operate on. As an example, and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example, and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example, and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example, and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 6:
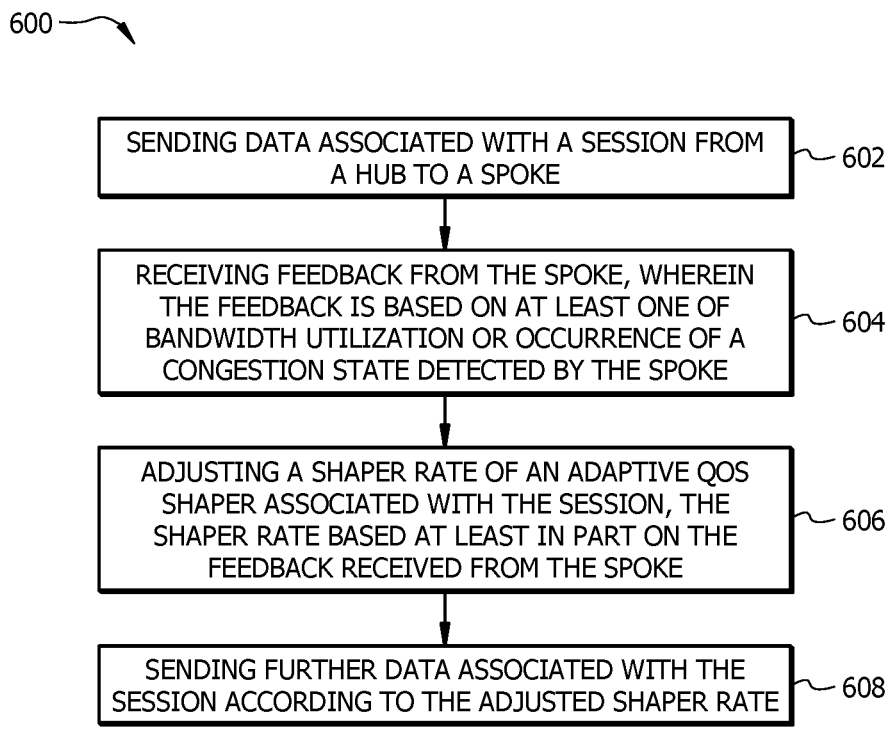
FIG. 6 illustrates an example of a method of adjusting a shaper rate based at least in part on the feedback from one or more remote routers.

FIG. 6 illustrates an example of a method 600 of adjusting a shaper rate at a hub router based at least in part on the feedback from one or more remote (spoke) routers. In certain embodiments, the method 600 may be performed by a system, such as BR1, BR2, BR3, or BR4 described above. In certain embodiments, the system may comprise one or more processors and one or more computer-readable non-transitory storage media. The one or more computer-readable non-transitory storage media comprises instructions that, when executed, cause one or more components to perform operations that include steps of the method 600.

The method 600 begins at step 602 with sending data from a hub (e.g., BR1) to a spoke (e.g., remote site 1). The data is associated with a session (e.g., hub-to-spoke session). The method 600 proceeds to step 604 with the hub receiving feedback from the spoke. The feedback is based on at least one of bandwidth utilization or occurrence of a congestion state detected by the spoke. As an example, the spoke may determine feedback based on bandwidth utilization by monitoring downstream throughput of the session on the PathMon receiver side (on a per tunnel basis) and may provide the feedback via a path monitor TLV parameter of a BFD protocol. In certain embodiments, the feedback may comprise a new field (e.g., "Expected Throughout" discussed above) included in the struct definition of a per sub-sequence name space (SNS) path_mon_TLV.

The method 600 proceeds to step 606 with the hub adjusting a shaper rate of an adaptive QoS shaper, such as an egress shaper that is associated with the session and used by the hub to shape traffic sent from the hub to the spoke. In certain embodiments, adjusting the shaper rate may comprise determining a shaper rate for the current adaptive interval and/or changing the shaper rate (increasing or decreasing the shaper rate) if the shaper rate determined for the current adaptive interval differs from the shaper rate used during the previous adaptive interval. The shaper rate is adjusted based at least in part on the feedback received from the spoke in step 604.

As an example, in response to the feedback indicating that the spoke has detected that the bandwidth utilization for the session has exceeded a threshold during the congestion state, adjusting the shaper rate comprises decreasing the shaper rate. As another example, in response to the feedback indicating that the spoke has detected the bandwidth utilization for the session is below the threshold during the congestion state, adjusting the shaper rate comprises not decreasing the shaper rate (e.g., the shaper rate for the current adaptive interval may be kept the same as the shaper rate as the previous adaptive interval). In certain embodiments, the congestion state occurs when the spoke detects that WAN loss has exceeded a WAN loss threshold.

In certain embodiments, bandwidth utilization is considered to exceed a bandwidth utilization threshold for the session when a session throughput of the session exceeds an expected throughput for the session. Similarly, bandwidth utilization is considered to be below a bandwidth utilization threshold for the session when a session throughput of the session is less than the expected throughput for the session. The expected throughput may be based on a weighting factor associated with the session and total bandwidth available to the spoke. The expected throughput may be indicated as feedback or may be used to calculate feedback. For example, as discussed above:

if (session_throughput<=total_bandwidth*weight/total_weight), then "Expected Throughput"=session throughput;

if (session_throughput>total_bandwidth*weight/total_weight), "Expected Throughput"= throughput_left*weight/total_weight_left; Thus, feedback based on bandwidth utilization may comprise expected throughput or other information related to or indicative of bandwidth utilization, depending on the embodiment.

As indicated above, the expected throughput may be based on a weighting factor associated with the session. The weighting factor may be configured to facilitate sharing bandwidth among multiple hubs. The weighting factor may be configured differently for different sessions and/or different hubs, for example, depending on traffic patterns, QoS requirements, etc. In certain embodiments, the hub may indicate the weighting factor to the spoke. As an example, the hub may publish the weighting factor in advance so that the weighting factor is available to the spoke that uses the weighting factor to provide the feedback. Certain embodiments publish the weighting factor across the SD-WAN fabric via OMP.

The method 600 then proceeds to step 608 with sending further data associated with the session. The further data is sent from the hub to the spoke according to the adjusted shaper rate of step 606.

In certain embodiments, the shaper rate used for the session may initially be based on a default bandwidth, and may be bounded based on a maximum bandwidth and a minimum bandwidth. Bandwidth parameters may be used to configure the bandwidth parameters (default bandwidth, maximum bandwidth, and minimum bandwidth). In certain embodiments, one or more of the bandwidth parameters used by the adaptive QoS shaper may be adjusted dynamically based on real-time performance. As an example:

the maximum bandwidth may be increased when the shaper rate has been set to the current maximum bandwidth for a first pre-determined period without WAN loss (but there is local loss or high traffic throughput); and/or the minimum bandwidth may be decreased when the shaper rate has been set to the current minimum bandwidth for a second pre-determined period with WAN loss.

In certain embodiments, detection of WAN loss may be based on a threshold. As an example, the "without WAN loss" condition may be detected if a WAN loss measurement is below the threshold, and the "WAN loss" condition may be detected if the WAN loss measurement is above the threshold. The threshold may be set to any suitable value (e.g., 0, 1, 2, . . . n). The first pre-determined period for increasing the maximum bandwidth may be the same as or differ from the second pre-determined time period for decreasing the minimum bandwidth. FIG. 3A illustrates an example in which the pre-determined period is set to five with respect to each of maximum bandwidth and minimum bandwidth. Thus, the maximum bandwidth may be dynamically increased based at least in part on the QoS shaper rate sticking to the current maximum bandwidth for five adapting time periods (as shown in time periods 2, 3, 4, 5, and 6 of FIG. 3A). Similarly, the minimum bandwidth may be dynamically decreased based at least in part on the QoS shaper rate sticking to the current minimum bandwidth for five adapting time periods (as shown in time periods 10, 11, 12, 13, and 14 of FIG. 3A).

Additionally, or in the alternative, certain embodiments dynamically adjust one or more of the bandwidth parameters (maximum bandwidth, minimum bandwidth, and/or default bandwidth used by the adaptive QoS shaper) based on a pattern of historical performance. FIG. 3B illustrates an example in which certain days of the week exhibit a pattern of using higher bandwidth (e.g., Mondays) and other days of the week exhibit a pattern of using lower bandwidth (e.g., Thursdays). Based on this pattern, certain embodiments may dynamically adjust the bandwidth parameters upward on Mondays and downward on Thursdays.

In certain embodiments, a spoke may provide reciprocal functionality to support the functionality provided by the hub in FIG. 6. As an example, the spoke may comprise a router of remote site 1 described above. The router may comprise one or more processors and one or more computer-readable non-transitory storage media. The one or more computer-readable non-transitory storage media comprises instructions that, when executed, cause one or more components to perform operations that include steps of the method performed by the spoke.

In certain embodiments, the method performed by the spoke includes receiving data associated with a session from the hub, determining feedback based on at least one of bandwidth utilization or occurrence of a congestion state detected by the spoke, and providing the feedback to the hub. The spoke may determine the feedback in any suitable manner, such as by determining an expected throughput, as discussed above. The spoke may provide the "Expected Throughput" to the hub via a path monitor TLV, for example.

In certain embodiments, the spoke monitors bandwidth utilization for multiple sessions, wherein each session may be associated with any of a plurality of hubs. As an example, the spoke may monitor a first session between the spoke and Hub BR1, a second session between the spoke and Hub BR2, a third session between the spoke and Hub BR3, and/or a fourth session between the spoke and BR4. For each session, the spoke weights the monitored bandwidth utilization based on a weighting factor configured for that session and provides feedback based on the bandwidth utilization to the hub associated with the session. Different sessions may be configured with different weighting factors, for example, based on traffic patterns, QoS requirements, etc. In this manner, the spoke facilitates sharing bandwidth among the hubs.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular directed to a method, a storage medium, a system and a computer program product, wherein any feature mentioned in one category, e.g. method, can be applicable in another category, e.g. system, as well. The various features disclosed herein may be combined or separated in any suitable manner.

The invention claimed is:

1. A system, the system comprising:
one or more processors; and
one or more computer-readable non-transitory storage media, the one or more computer-readable non-transitory storage media comprising instructions that, when executed by the one or more processors, cause one or more components of the system to perform operations comprising:
sending data from a hub to a spoke, wherein the data is associated with a session; receiving, at the hub, feedback from the spoke, the feedback based on at least one of bandwidth utilization or occurrence of a congestion state detected by the spoke;
wherein the feedback indicates that the bandwidth utilization for the session has exceeded a threshold when a session throu$_2$hput of the session exceeds an expected throu$_2$hput for the session, the expected throughput based on a weighting factor associated with the session and total bandwidth available to the spoke;
in response to the feedback indicating that the spoke has detected that the bandwidth utilization for the session has exceeded the threshold during the congestion state, adjusting, by the hub, a shaper rate of an adaptive Quality of Service (QoS) shaper associated with the session, the shaper rate based at least in part on the feedback received from the spoke; and
wherein adjusting the shaper rate comprises decreasing the shaper rate.

2. The system of claim 1, wherein the congestion state occurs when the spoke detects wide area network (WAN) loss exceeding a WAN loss threshold.

3. The system of claim 1, further comprising:
indicating the weighting factor to the spoke.

4. The system of claim 1, wherein:
in response to the feedback indicating that the spoke has detected the bandwidth utilization for the session is below a threshold during the congestion state, adjusting the shaper rate comprises not decreasing the shaper rate.

5. The system of claim 1, wherein the feedback is received via a path monitor type-length-value (TLV) parameter of a bidirectional forwarding detection (BFD) protocol.

6. The system of claim 1, further comprising:
adjusting a value of a bandwidth parameter used by the adaptive QoS shaper dynamically based on real-time performance, wherein the bandwidth parameter corresponds to a maximum bandwidth, a minimum bandwidth, or a default bandwidth.

7. The system of claim 6, wherein dynamically adjusting the value of the bandwidth parameter comprises at least one of:
increasing the maximum bandwidth when the shaper rate has been set to a current maximum bandwidth for a first pre-determined period without WAN loss; and
decreasing the minimum bandwidth when the shaper rate has been set to a current minimum bandwidth for a second pre-determined period with WAN loss.

8. The system of claim 1, further comprising:
adjusting a bandwidth parameter used by the adaptive QoS shaper dynamically based on a pattern of historical performance, wherein the bandwidth parameter corresponds to a maximum bandwidth, a minimum bandwidth, or a default bandwidth.

9. A method, the method comprising:
sending data from a hub to a spoke, wherein the data is associated with a session;
receiving, at the hub, feedback from the spoke, the feedback based on at least one of bandwidth utilization or occurrence of a congestion state detected by the spoke; and
adjusting, by the hub, a shaper rate of an adaptive Quality of Service (QoS) shaper associated with the session, the shaper rate based at least in part on the feedback received from the spoke;
increasing a maximum bandwidth associated with the adaptive QoS shaper dynamically based on real-time performance, the maximum bandwidth increased when the shaper rate has been set to a current maximum bandwidth for a first pre-determined period without WAN loss; and
decreasing a minimum bandwidth associated with the adaptive QoS shaper dynamically based on real-time performance, the minimum bandwidth decreased when the shaper rate has been set to a current minimum bandwidth for a second pre-determined period with WAN loss.

10. The method of claim 9, wherein adjusting the shaper rate comprises:
decreasing the shaper rate in response to the feedback indicating that the spoke has detected that the bandwidth utilization for the session has exceeded a threshold during the congestion state; and
not decreasing the shaper rate in response to the feedback indicating that the spoke has detected the bandwidth utilization for the session is below the threshold during the congestion state.

11. The method of claim 10, wherein:
the feedback indicates that the bandwidth utilization for the session has exceeded a threshold when a session throughput of the session exceeds an expected throughput for the session;
the feedback indicates that the bandwidth utilization for the session is below the threshold when the session throughput of the session is below the expected throughput for the session;
the expected throughput for the session is based on a weighting factor associated with the session and total bandwidth available to the spoke; and
the congestion state occurs when the spoke detects wide area network (WAN) loss exceeding a WAN loss threshold.

12. The method of claim 9, further comprising:
adjusting a bandwidth parameter used by the adaptive QoS shaper dynamically based on a pattern of historical performance, wherein the bandwidth parameter corresponds to a maximum bandwidth, a minimum bandwidth, or a default bandwidth.

13. One or more computer-readable non-transitory storage media embodying instructions that, when executed by a processor, cause the performance of operations including:

sending data from a hub to a spoke, wherein the data is associated with a session;

receiving, at the hub, feedback from the spoke, the feedback based on at least one of bandwidth utilization or occurrence of a congestion state detected by the spoke;

adjusting, by the hub, a shaper rate of an adaptive Quality of Service (QoS) shaper that the hub uses to shape traffic associated with the session, the shaper rate based at least in part on the feedback received from the spoke;

increasing a maximum bandwidth associated with the adaptive QoS shaper dynamically based on real-time performance, the maximum bandwidth increased when the shaper rate has been set to a current maximum bandwidth for a first pre-determined period without WAN loss;

decreasing a minimum bandwidth associated with the adaptive QoS shaper dynamically based on real-time performance, the minimum bandwidth decreased when the shaper rate has been set to a current minimum bandwidth for a second pre-determined period with WAN loss; and sending further data associated with the session according to the adjusted shaper rate.

14. The one or more computer-readable non-transitory storage media of claim 13, wherein adjusting the shaper rate comprises:

decreasing the shaper rate in response to the feedback indicating that the spoke has detected that the bandwidth utilization for the session has exceeded a threshold during the congestion state; and not decreasing the shaper rate in response to the feedback indicating that the spoke has detected the bandwidth utilization for the session is below the threshold during the congestion state.

15. The one or more computer-readable non-transitory storage media of claim 14, wherein:

the feedback indicates that the bandwidth utilization for the session has exceeded a threshold when a session throughput of the session exceeds an expected throughput for the session;

the feedback indicates that the bandwidth utilization for the session is below the threshold when the session throughput of the session is below the expected throughput for the session;

the expected throughput for the session is based on a weighting factor associated with the session and total bandwidth available to the spoke; and the congestion state occurs when the spoke detects wide area network (WAN) loss exceeding a WAN loss threshold.

16. The one or more computer-readable non-transitory storage media of claim 13, wherein the operations further include:

adjusting a bandwidth parameter used by the adaptive QoS shaper dynamically based on a pattern of historical performance, wherein the bandwidth parameter corresponds to a maximum bandwidth, a minimum bandwidth, or a default bandwidth.

* * * * *